United States Patent [19]

Reid

[11] E Patent Number: Re. 32,474

[45] Reissued Date of Patent: Aug. 11, 1987

[54] VARIABLE TIME DELAY APPARATUS FOR CONTROLLING THE START OF A VEHICLE

[76] Inventor: Dennis Reid, P.O. Box 5684, Walnut Creek, Calif. 94596

[21] Appl. No.: 898,312

[22] Filed: Aug. 20, 1986

Related U.S. Patent Documents

Reissue of:

[64] Patent No.: 4,467,219
Issued: Aug. 21, 1984
Appl. No.: 385,542
Filed: Jun. 7, 1982

[51] Int. Cl.[4] ..... H01H 43/04

[52] U.S. Cl. ..... 307/10 R; 307/9; 307/141; 123/333; 180/315; 361/196

[58] Field of Search ..... 307/9, 10 R, 10 AT, 307/132, 142, 126, 141.8, 141.4, 141; 180/276, 283, 284, 287, 336, 289, 315, 333; 340/52 R, 52 B, 52 F, 63, 64, 41 R, 41 A, 43, 252 R; 361/196, 195, 194, 198, 197; 123/179 R, 179 K, 179 SE, 334, 335; 188/110, 181 R, 181 A; 192/0.03, 0.042, 0.044, 0.046, 0.048, 0.049, 1, 46, 4 R, 4 A, 3 TR, 6 A, 7, 8 R, 8 A, 8 C, 13 R

[56] References Cited

U.S. PATENT DOCUMENTS

| | | | |
|---|---|---|---|
| 3,376,429 | 4/1968 | Atkins et al. | 307/141 |
| 3,814,948 | 6/1974 | Schuchmann et al. | 307/141 |
| 4,051,915 | 10/1977 | Behrens | 180/82 |
| 4,204,128 | 5/1980 | Kruper | 307/141 |
| 4,206,613 | 6/1980 | Shockley | 62/133 |
| 4,276,483 | 6/1981 | Hayden | 307/10 R |
| 4,286,683 | 9/1981 | Zeigner et al. | 307/10 R X |
| 4,436,176 | 3/1984 | Cota et al. | 180/287 |
| 4,596,215 | 6/1986 | Palesotti | 180/333 X |

*Primary Examiner*—William M. Shoop, Jr.
*Assistant Examiner*—Shik Luen Paul Ip
*Attorney, Agent, or Firm*—Limbach, Limbach & Sutton

[57] ABSTRACT

A circuit for providing an adjustable period of delay in a vehicle which is started by engaging the engine of the vehicle and a brake means, then disengaging the brake means after the period of delay, has a relay for selectively engaging and disengaging the brake. A variable time delay provides the period of delay. A switch selectively causes the relay to engage the brake and then to disengage the brake after the period of delay. A safety activation means prevents the relay from engaging the brake means in the absence of the switch selected to cause the relay to engage the brake means.

20 Claims, 2 Drawing Figures

VARIABLE TIME DELAY APPARATUS FOR CONTROLLING THE START OF A VEHICLE

Matter enclosed in heavy brackets [ ] appears in the original patent but forms no part of this reissue specification; matter printed in italics indicates the additions made by reissue.

BACKGROUND OF THE INVENTION

The present invention relates to a variable time delay apparatus for controlling the start of a vehicle and, more particularly, for controlling the start of a racing vehicle after a preset period of delay.

In the sport of automotive racing, the race is begun by a starting system consisting of a series of lights of various numbers, commonly called "Christmas tree" lights. Typically, there are one to five warning lights of amber color, one green colored light to indicate the start of the race and one red light to indicate a foul start. Vehicles are aligned in a row, and when the green light appears, the vehicles start the race. To attempt to obtain the best start, vehicles are placed in low gear with the reverse gear, simultaneously applied thereto, thereby "jamming" the transmission. To apply the reverse gear to jam the transmission, a solenoid is activated holding the reverse gear in place. The transmission is jammed because both forward and reverse gears are applied at the same time. The engine is run at high speed, i.e., at high horse power. When the solenoid is released, the reverse gear is released thereby unjamming the transmission. The power is then instantly transmitted to the wheels through the low gear. This results in extremely quick acceleration of the race vehicle. In addition, some vehicles are provided with a "roll control" solenoid that locks the brakes on the car, acting in much the same manner as applying the reverse gear of the transmission. The release of the solenoid to the brake of the vehicle also releases the car for quick acceleration.

Ideally, the vehicle should leave the starting line at exactly the time when the green light turns on. To accomplish this, however, the driver must anticipate the green light and release the solenoid before the green light comes on. This is because the driver has his reaction time and the car also has its reaction time, before the car actually starts moving.

Most cars now take off so fast that if the driver releases the solenoid to either the reverse gear or to the brake or to both, on the last amber warning light, the car will take off before the green light, thereby obtaining a foul start. At present, the driver must see the last amber warning light, hesitate slightly, and then release the solenoid or solenoids. This results in inconsistent starts.

Delay circuits are well known in the art. See, for example, U.S. Pat. Nos. 3,814,948; 4,276,483; 4,051,915; 4,204,128; 4,206,613; 3,376,429. None of the references, however, teaches an adjustable time delay apparatus for controlling the start of a racing vehicle after a preset period of delay.

SUMMARY OF THE INVENTION

In the present invention, a variable time delay apparatus controls the start of a racing vehicle after a preset period of delay, wherein the vehicle is started by engaging the engine of the vehicle and simultaneously engaging a braking means. The braking means is then disengaged after the period of delay. The apparatus comprises a relay means for selectively engaging and disengaging the braking means. A variable time delay means sets the period of delay. A switch means selectively causes the relay means to engage the brake means and to disengage the brake means after the period of delay. Finally, safety activation means prevents the relay means from engaging the brake means in the absence of the switch means selected to cause the relay means to engage the brake means.

DETAILED DESCRIPTION OF THE INVENTION

Figure 1:
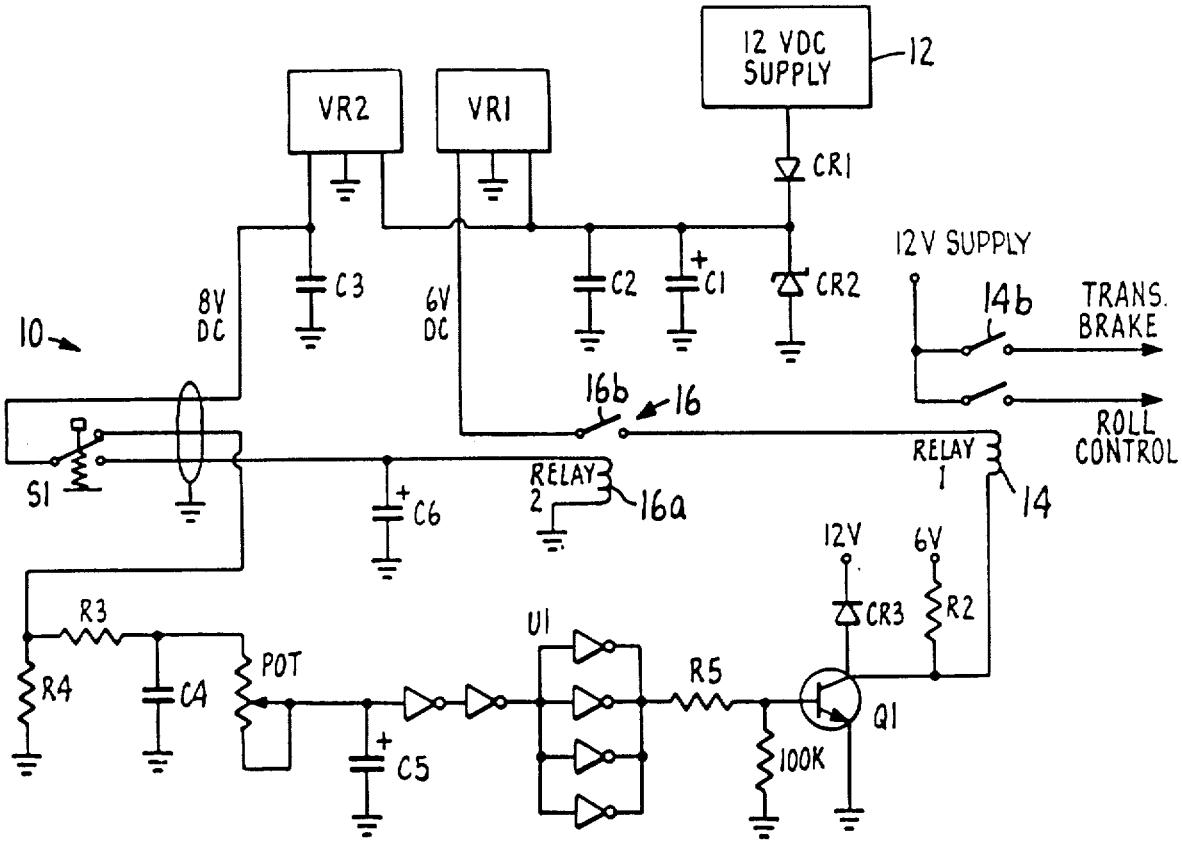
FIG. 1 is a schematic diagram of an analog version of the variable time delay circuit of the present invention.

Referring to FIG. 1, there is shown a schematic circuit of an analog time delay apparatus 10 of the present invention. A source 12 supplies twelve volts D.C. power to the apparatus 10 of the present invention. The source 12 is supplied to the apparatus 10 through a first diode CR1. The diode CR1 prevents damage to the apparatus 10 in case the ground and power leads are mistakenly reversed during installation. A second diode CR2, a Zener diode, protects the apparatus 10 from over voltage or electrical noise spikes which are prevalent in automobile electrical systems and, in particular, in race car ignition systems. Capacitors C1, C2, and C3 in parallel electrically with second diode CR2 help to absorb electrical noise spikes and to filter the source 12 and to provide a stable voltage supply to the rest of the apparatus 10. The twelve volt D.C. power from the source 12 is supplied to a first voltage regulator VR1, and a second voltage regulator VR2. The first voltage regulator VR1 converts the twelve volts D.C. to six-volts D.C. The second voltage regulator VR2 converts the twelve volts D.C. to 8-volts D.C.

From the second voltage regulator VR2, the eight-volt DC power is passed through a switch S1. Switch S1 has two positions, a first position and a second position.

In the first position, the eight-volt D.C. power from the second voltage regulator VR2 passes through a resistive network comprising of resistors R3 and R4. Capacitor C4 is in series electrically with the resistors R3 and the series combination of C4 and R3 is in parallel with R4. A variable potentiometer P is also connected electrically in parallel with the capacitor C4. From the variable potentiometer P, the power is supplied to a timing integrated circuit U1. The output of integrated circuit U1 drives a transistor Q1. The transistor Q1 turns on and off power to the first coil 14a of a first relay 14. Third diode CR3 prevents the high voltage inductive spike caused by shutting off the first coil 14a from damaging the transistor Q1. The contact arm 14b of the first relay 14 is interposed between the twelve volt power supply 12 of the car to the solenoid that locks the brakes ("roll control" solenoid) and the solenoid that locks the reverse gear of the transmission "transmission brake" solenoid (hereinafter collectively referred to as the "braking solenoids"). Six volt D.C. power from the first voltage regulator VR1 is supplied to the first coil 14a after passing through a second contact arm 16b of a second relay 16.

In its second position, the eight-volt D.C. power from the second voltage regulator VR2 is supplied to a capacitor C6 and a second coil 16a of a second relay 16 which are connected electrically in parallel. The shield of the wire to switch S1 is grounded thereby shielding the wires from electrical noise. Normally, switch S1 is in the first position.

The capacitor C4 increases immunity to the high frequency noise so that timing errors would not occur. Resistor R3, capacitor C5 and the potentiometer P determine the amount of time delay. The higher the resistance of the potentiometer P, the longer the delay. The slider arm of the potentiometer P is also connected to the unused terminal of the potentiometer P to minimize noise pickup. Resistor R3 provides a minimum amount of resistance so that even when the potentiometer P's resistance is zero, the apparatus 10 will still function. Resistor R4 provides an electrical path to ground so that timing capacitor C5 will discharge and cause the integrated circuit U1 to turn on. Resistor R2 provides a positive voltage to the collector of transistor Q1 so that the collector does not electrically "float" when the second contact arm 16b is released.

In the operation of the apparatus 10 of the present invention, the driver of the racing vehicle will have adjusted the potentiometer P to suit his reaction time and the reaction time of his vehicle. The switch S1 is normally in the first position. The car rolls slowly towards the starting line and when the car reaches the starting line, switch S1 is pressed into the second position. Pressing the switch S1 into the second position activates the first relay 14 and the second relay 16, which turns on the braking solenoids. This stops the car at the starting line. Switch S1 is released, typically when the Christmas tree amber lights start counting down or when the last amber light before the green light turns on, returning it to the first position. The period of time delay commences.

When the switch S1 is pressed into its second position, the timing capacitor C5 discharges and turns on the output of the integrated circuit U1. This causes the transistor Q1 to turn on. At the same time, because switch S1 is in the second position, the second coil 16a is energized, which closes off the second contact arm 16b. This connects the first coil 14a to the six-volt power from the first voltage regulator VR1. Power then flows from the first voltage regulator VR1 to the first coil 14a, because transistor Q1 is turned on. The energization of the first coil 14a causes the first contact arms 14b to close, permitting power from the twelve volt supply 12 to be applied to the braking solenoids. This then locks the vehicle in place.

When the switch S1 is released during the amber light, returning the switch to the first position, power from the second voltage regulator VR2 is removed from the second coil 16a. However the second coil 16a continues to close the second contact arm 16b because power is supplied by the capacitor C6. Power from the eight-volt D.C. from the second voltage regulator VR2 is then supplied to the timing capacitor C5 and the potentiometer P. The output of the integrated circuit U1 stays on because C5 is still charging up. The first coil 14a of the first relay 14, therefore, continues to hold the first contact arm 14b which provides power from the supply 12 to the braking solenoids.

When the timing capacitor C5 has charged sufficiently to turn off the integrated circuit U1, the transistor Q1 is then turned off. This then shuts off the power from VR1 to the first coil 14a. The amount of time of delay to release the braking solenoids is determined by the amount of time the capacitor C5 takes to charge to the point of turning off integrated circuit U1. Integrated circuit U1 has a voltage level, such that when the voltage of C5 exceeds that level, integrated circuit U1 will turn off the transistor Q1. The time period for charging capacitor C5 is determined by resistors R3 and potentiomater P.

Subsequently, when the capacitor C6, which is in parallel electrically with the second relay 16 has discharged sufficiently, second coil 16a then releases the second contact arm 16b thereto.

From the foregoing description, it is seen that the apparatus 10 of the present invention is designed to be "fail safe" in the event of a component failure. As can be seen, the second coil 16a must be energized in order to close the second contact arm 16b in order to suppy power to the first coil 14a to permit it to turn on. The second coil 16a of the second relay 16 can only be energized by pushing the switch S1. If capacitor C6 should fail in the "shorting mode", it merely drags the voltage supply from the second voltage regulator VR2 down and blows a fuse in the vehicle. If the capacitor C6 fails in the "open mode", the second coil 16a will release when the switch S1 is released returning it to the first position. This will cause the first coil 14a to be released instantly. This poses no danger since the driver is ready to go and at worst, a false start is incurred. With the apparatus 10 of the present invention, it is not possible to re-energize the braking solenoids without depressing switch S1. This Safety feature prevents the braking solenoids from being applied when the vehicle is traveling at high speeds. The safety aspect of the apparatus 10 of the present invention is important because in racing vehicles, electrical noise is extremely prevalent. Such electrical noise can accidently reactivate the first coil 14a causing catastrophic consequences in the absence of a safety mechanism, as provided by the present invention.

The six-volt D.C. power from the first voltage regulator VR1, which is a constant voltage source for the first coil 14a, and the eight volt D.C. power from the second voltage regulator VR2 for the timing portion of the apparatus 10 ensure that the apparatus 10 will always function correctly. This is because in a racing vehicle, the electrical source is a twelve-volt battery. As the battery begins to run down, variation in the voltage supply can occur. By stepping down the voltage through voltage regulators VR1 and VR2, this assures that the apparatus 10 will not fail due to low voltage from the battery and will produce a constant time delay regardless of the voltage.

Electrical noise in a racing vehicle can take the form of very short negative voltage spikes. When the switch S1 is in the second position, the input to the timing portion of the apparatus 10 is low voltage (0 volts because it is tied to ground). Therefore, there isn't any negative voltage spike. When the switch S1 is released and is in the first position, the timing capacitor C5 begins to charge. Negative voltage spikes cause no problem at this point because the requisite tripping voltage of the integrated circuit U1 has not yet been reached. When the capacitor C5 charges to the tripping voltage of integrated circuit U1, the drive transistor Q1 is turned off, turning off the first relay 14. From this point on, negative voltage spikes can instantly turn on the first relay 14 for the time length of the spike. However, since the input of the integrated circuit U1 is a Schmitt trigger, it requires a large voltage change to switch on the integrated circuit U1. Thus, not many negative voltage spikes can cause problems. Those that do pose potential problems are quick in comparison to the reaction time of the first relay 14. Thus, the relay 14 is immuned to electrical noise. Finally, when the second relay 16 is de-energized, no voltage spike can pose any problem to the first relay 14 because there is no power to the relay 14. It is, therefore, seen that the apparatus 10 of the present invention is immuned to electrical noise and voltage fluctuation that are inherent in an electrically dirty environment, such as a racing vehicle.

In the preferred embodiment, the apparatus 10 will have the following component values:

| Parts List | | | |
|---|---|---|---|
| R2 | 2.2k RESISTORS | VR1 | LM340T-6 Voltage Regulator |
| R3 | 1.0k | VR2 | LM340T-8 |
| R4 | 1.0k | RELAY 14 | Potter Brumfield KuP11D15 6v |
| R5 | 1.0k | | |
| R6 | 100k | RELAY 16 | Aromat HA1-DC9v |
| C1 | 10 μf 25v CAPACITORS | POT | OHMITE CLU 1041.1MEG |
| C2 | .1 μf 35v | Q1 | 2N2222A |
| C3 | 1 μf | U1 | CD4584 BC |
| C4 | .0047 μf | | |
| C5 | 1.0 μf | | |
| C6 | 470 μf | | |
| CR1 | IN4001 DIODES | | |
| CR2 | IN967B | | |
| CR3 | IN4148 | | |

Figure 2:
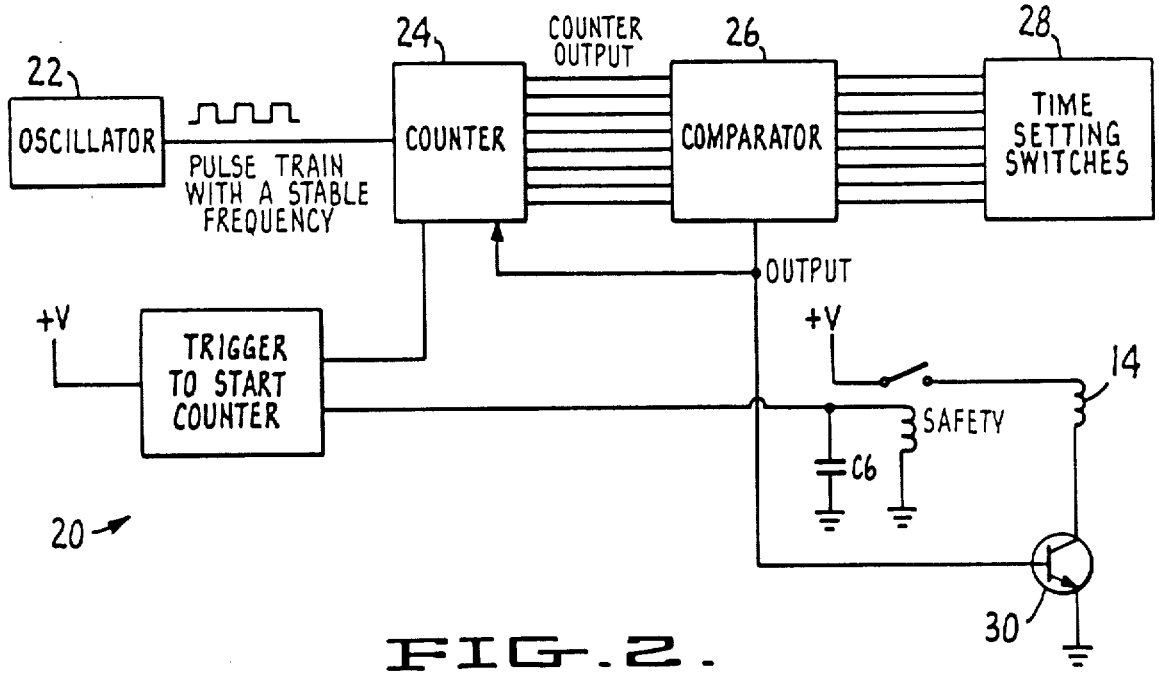
FIG. 2 is a schematic diagram of a digital version of the variable time delay circuit of the present invention.

Referring to FIG. 2, there is shown a digital version of the apparatus 10 of the present invention. This digital apparatus 20 comprises an oscillator 22. The oscillator 22 oscillates at a stable frequency providing a train of pulses. The pulses enter into a counter 24. The output of the counter 24 is supplied to a comparator 26. A time setting switch 28 supplies a digital number corresponding to the amount of delay desired and is also supplied to the comparator 26. The output of the comparator 26 is connected to the base of the transistor 30. The first coil 14a of a first relay 14 is connected to the collector of the transistor 30. Power from a constant D.C. voltage source is supplied to the first coil 14a through a second contact arm 16b of a second relay. A switch S1 is selectable between first position and a second position. In a first position, switch S1 enables the counter 24. The output of the comparator 26 disables the counter 24 when the digital number from the time setting switch 28 equals the digital number from the counter 24. In a second position, switch S1 is connected to the second coil 16b of the second relay 16 and resets the counter 24. A capacitor C6 is connected electrically in parallel with the second coil 16b of the second relay 16.

In the operation of the apparatus 20 of the present invention, the driver selects the amount of time delay by setting the time-setting switches 28. Switch S1 is then pressed into the second position. This resets the counter 24. At the same time, power is supplied to the second coil 16a of the second relay 16, closing the second contact arm 16b. This closes the circuit providing power to the first relay 14. When the switch S1 is released, it returns to the first position and the counter 24 counts the pulses from the oscillator 22. The comparator 26 receives the output from the counter 24 and from the time-setting switch 28. When the two are equal, indicating that the prequisite period of time delay has passed, the comparator 26 sends a signal to the base of the transistor 30 thus turning the transistor 30 off. The first coil 14a of the first relay 14 is then de-energized releasing the braking solenoids. A short while later, the capacitor C6 will have discharged sufficiently to cause the second coil 16a to release the contact arm 16b thereto. This opens the circuit to the first coil 14a of the first relay 14.

In a variation of the digital variable time delay circuit of FIG. 2, the digital number in the time setting switch 28 (representing the amount of delay), sets a count down counter 24. When the switch S1 is released returning it to the first position, the counter 24 counts down from the number set by the time setting switches 28. When the counter 24 reaches the value of "0", a signal is sent to the transistor 30 turning the transistor 30 off.

In general, the second relay 16 can be replaced by any other type of switch. The switch can be connected based upon the throttle position or based upon the pressure of the transmission or brake lines. In addition, an acceleration switch which locks out transmission under any condition except standing still can also be used. Finally, of course, the safety relay 16 can be simply a second switch.

The first relay 14 can also be any other type of electronic device for switching high power levels, such as an electronic relay, a power transistor or a silicon controlled rectifier (SCR). A mechanical relay is shown only for the purpose of illustration and is believed at present to be more reliable than the other afore-mentioned devices.

The apparatus 10 of the present invention can also be used on vehicles having manual transmission. A hydraulic clutch linkage can be used. A "roll control" valve will be installed in the hydraulic line and it will be operated by the apparatus 10 of the present invention. The driver would push in the clutch, activate the apparatus 10 by pushing the switch S1, removing the foot from the clutch, and then releasing the switch S1 when the last amber light comes on. After the requisite delay period has passed, the apparatus will then de-energize the "roll control" coil which would de-energize the "roll control" valve. The hydraulic line pressure would drop and the clutch would be released, thereby moving the car.

What is claimed is:

1. A variable time-delay circuit for controlling the start of a vehicle after a preset period of delay wherein said vehicle is started by engaging the engine of said vehicle and braking means to hold said vehicle, then disengaging said braking means after said period of delay, said apparatus, having electrical power supplied thereto, comprising:

relay means for selectively engaging and disengaging said braking means;

adjustable time delay means for setting said period of delay;

switch means for selectively causing said relay means to engage said brake means and to disengage said brake means after said period of delay; and safety activation means preventing said relay means from engaging said braking means in the absence of said switch means selected to cause said relay means to engage said brake means.

2. The apparatus of claim 1, wherein said relay means is an electrically operated solenoid.

3. The apparatus of claim 1 further comprising filtering means for filtering the electrical power supplied to said apparatus; and voltage regulation means for regulating the voltage of the electrical power to said apparatus.

4. The apparatus of claim 1, wherein said safety activation means is interposed between said relay means and the electrical power thereto.

5. The apparatus of claim 4, wherein said safety activation means comprises a switch.

6. The apparatus of claim 4, wherein said safety activation means comprises:

an electrically operated solenoid;

a relay contact, operable by said solenoid and disposed between said relay means and the power thereto; and a capacitor in parallel electrically with said solenoid and disposed in series electrically with said switch means.

7. The apparatus of claim 1, wherein said variable time delay means is a digital means.

8. The apparatus of claim 7, wherein said digital means comprises:

pulse generating means for generating pulses;

counter means for counting said pulses;

time switch means for setting said period or delay;

comparator means for comparing the setting of said time switch means with said counter means and for producing a signal when said setting and said counting are equal; and said signal for disengaging said relay means.

9. The apparatus of claim 1, wherein said variable time delay means is an analog means.

10. The apparatus of claim 9, wherein said analog means further comprises:

charging means;

a variable resistor, having a variable resistance for setting said period of delay;

said charging means charging through said variable resistor causing said period of delay; and level detection means for disengaging said relay means after said charging means has been charged.

11. The apparatus of claim 10, wherein said charging means is a capacitor and said resistor in parallel electrically with said capacitor.

*12. A variable time delay circuit for controlling the start of a vehicle after a preset period of delay wherein said vehicle is started by engaging the engine of said vehicle and braking means to hold said vehicle, then disengaging said braking means after said period of delay, said apparatus, having electrical power supplied thereto, comprising:*

*relay means for selectively engaging and disengaging said braking means;*

*adjustable time delay means for setting said period of delay; and*

*switch means for selectively causing said relay means to engage said brake means and to disengage said brake means after said period of delay.*

*13. The apparatus of claim 12, wherein said relay means is an electrically operated solenoid.*

*14. The apparatus of claim 12, further comprising*

*filtering means for filtering the electrical power supplied to said apparatus; and*

*voltage regulation means for regulating the voltage of the electrical power to said apparatus.*

*15. The apparatus of claim 12, wherein said adjustable time delay means is a digital means.*

*16. The apparatus of claim 15, wherein said digital means comprises:*

*pulse generating means for generating pulses;*

*counter means for counting said pulses;*

*time switch means for setting said period of delay;*

*comparator means for comparing the setting of said time switch means with said counter means and for producing a signal when said setting and said counting are equal; and* said signal for disengaging said relay means.

*17. The apparatus of claim 12, wherein said adjustable time delay means is an analog means.*

*18. The apparatus of claim 17, wherein said analog means further comprises:*

*charging means;*

*a variable resistance means for setting said period of delay;*

*said charging means charging through said variable resistance means causing said period of delay; and*

*level detection means for disengaging said relay means after said charging means has been charged.*

*19. The apparatus of claim 18, wherein said variable resistance means is a variable resistor.*

*20. The apparatus of claim 19, wherein said charging means is a capacitor and said resistor is in parallel electrically with said capacitor.*

• • • • •